United States Patent [19]
Barkmann

[11] 3,788,388
[45] Jan. 29, 1974

[54] HEAT EXCHANGE SYSTEM

[75] Inventor: Herman G. Barkmann, Santa Fe, N. Mex.

[73] Assignee: Q-dot Corporation, Santa Fe, N. Mex.

[22] Filed: Feb. 19, 1971

[21] Appl. No.: 116,758

Related U.S. Application Data
[63] Continuation-in-part of Ser. No. 824,584, May 14, 1969, abandoned.

[52] U.S. Cl.................... 165/32, 165/59, 165/105
[51] Int. Cl............................................. F28d 15/00
[58] Field of Search........... 165/32, 105, 66, 96, 59; 62/383

[56] References Cited
UNITED STATES PATENTS

| | | | |
|---|---|---|---|
| 3,698,472 | 10/1972 | Gold et al. | 165/66 X |
| 1,700,840 | 2/1929 | Gay | 165/47 X |
| 2,237,054 | 4/1941 | Jensen | 165/105 X |
| 2,350,347 | 6/1944 | Gaugler | 62/494 X |
| 2,206,858 | 7/1940 | McKee | 165/106 X |
| 1,725,906 | 8/1929 | Gay | 165/105 |
| 3,229,759 | 1/1966 | Grover | 165/105 |
| 2,093,725 | 9/1937 | Hull | 165/105 X |
| 3,194,308 | 7/1965 | Haried | 165/107 X |
| 2,019,351 | 10/1935 | Lathrop | 165/66 X |
| 2,026,423 | 12/1935 | Fiene | 165/105 X |

FOREIGN PATENTS OR APPLICATIONS

| | | | |
|---|---|---|---|
| 767,087 | 1/1957 | Great Britain | 165/105 |
| 767,085 | 1/1957 | Great Britain | 165/105 |
| 981,083 | 1/1965 | Great Britain | 165/105 |

*Primary Examiner*—Albert W. Davis, Jr.
*Attorney, Agent, or Firm*—Richards, Harris & Hubbard

[57] ABSTRACT

A heat exchange system for transferring heat between intake air flowing into an enclosure and exhaust air flowing out of the enclosure. The system includes a plurality of fins and a plurality of heat pipes each extending into engagement with all of the fins. Half of the fins are positioned for engagement by the intake air and half are positioned for engagement by the exhaust air. The heat pipes are bi-directional and self regulating so that both the direction and the rate of heat transfer in the system depend upon the relative temperatures of the intake air and the exhaust air. The efficiency of the heat pipes can also be regulated to control the temperature of the air entering the enclosure by elevating the ends of the heat pipes, either manually or automatically to control the temperature of the incoming air.

21 Claims, 7 Drawing Figures

INVENTOR
HERMAN G. BARKMANN

*Richards, Harris & Hubbard*
ATTORNEY

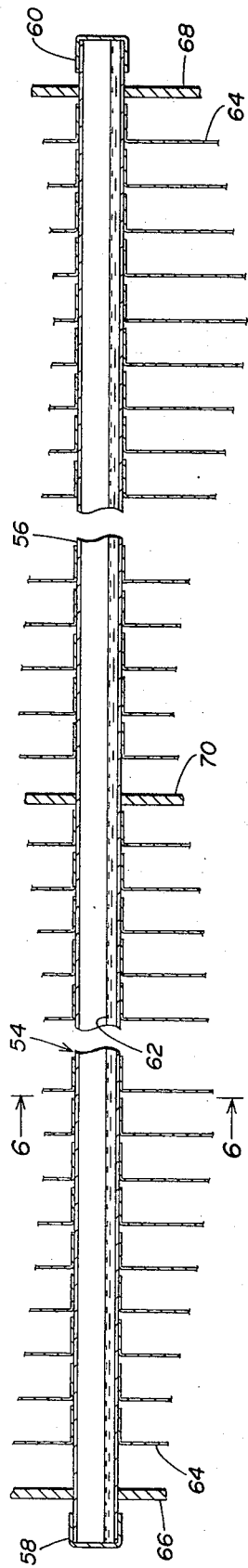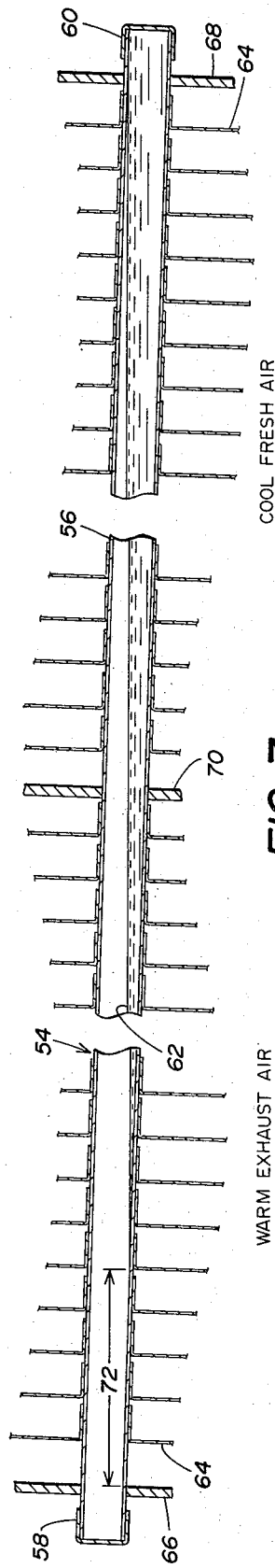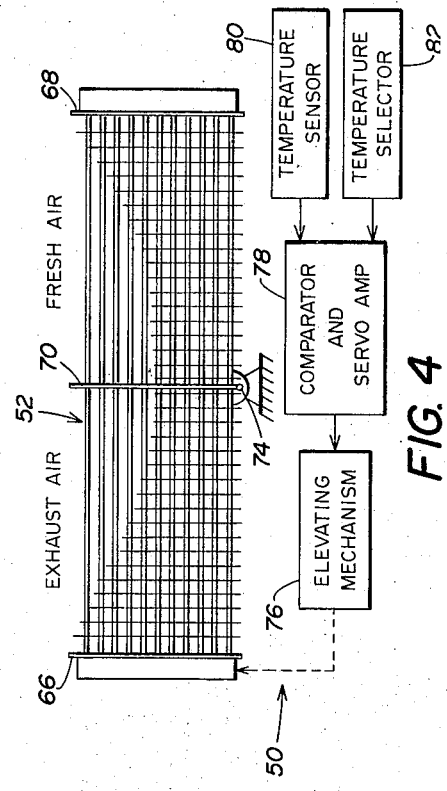

HEAT EXCHANGE SYSTEM

BACKGROUND OF THE INVENTION

This is a continuation-in-part application of U. S. application Ser. No. 824,584, filed May 14, 1969, now abandoned, entitled HEAT EXCHANGE SYSTEM.

Ventilating systems for builings and other enclosures often include regenerators. The function of a regenerator is to exchange heat between intake air as it flows into the enclosure and exhaust air as it flows out of the enclosure. Thus, in the winter, heat from the exhaust air is used to preheat the intake air. In the summer, on the other hand, the exhaust air absorbs heat from the intake air.

In the past, most regenerators have been one or the other of two types. In one type, two heat exchanging members are employed. Each of the members includes a body of a heat absorbing material, such as steel wool. Regenerators of this type operate in two phases. First, exhaust air is directed through a first of the heat exchanging members and intake air is directed through a second of the heat exchanging members. During this phase, the temperature of the first heat exchanging member is driven toward the temperature of the exhaust air. Later, the paths of the intake air and the exhaust air are switched. That is, intake air is directed through the first heat exchanging member and exhaust air is directed through the second heat exchanging member. During this phase, the flow of the intake air through the heat absorbing material of the first heat exchanging member tends to drive the temperature of the intake air toward the temperature of the exhaust air. This type regenerator requires the use of two bodies of heat absorbing material plus a diverting mechanism for alternately directing the intake air and the exhaust air through the first and the second heat exchanging members.

In one form of this type of regenerator, a body of heat absorbing material is mounted on a wheel. The wheel is rotated to move the body of heat absorbing material first through a stream of exhaust air and then through a stream of intake air. This type of regenerator requires a motor for rotating the wheel together with a control mechanism for regulating the speed of the motor in accordance with the relative temperatures of the exhaust air and the intake air. In the second type of regenerator, the two heat exchange members may be located in the intake and exhaust air streams and consist of finned tube coils. A solution of glycol is pumped through one tube coil then through the second tube coil and is returned to the first coil by means of a glycol circulating pump. Heat is transferred from the coil to the other by virtue of the heating and cooling of the glycol solution.

This invention relates to a system for transferring thermal energy between air being exhausted from an enclosure and air being introduced to the enclosure. This is achieved by utilizing a plurality of bidirectional heat pipes, different sections of which are exposed to the outgoing and incoming air. As a result of the use of the bidirectional heat pipes, incoming hot air in the summer is cooled by the transfer of heat to outgoing cool air. In the winter, incoming cold air is heated by energy transferred from outgoing warm air.

For many applications, the system of the present invention may be entirely passive in that it requires no change in operating conditions between summer and winter. For some applications, however, the temperature to which the incoming cold air in the winter is to be heated is to be purposely limited. For example, many heating systems preheat the incoming air to only 50° F. This air is then transferred to various rooms having individual thermostatic controls, where the air is further heated to achieve the desired room temperature. The relatively low incoming temperature of 50° is selected because some of the rooms may house equipment or a large number of people which generate the additional thermal energy required to heat the air to a comfortable temperature of around 72°. These rooms may in effect be cooled even in the winter. Since the system in accordance with the present invention typically achieves from 60 to 70 percent heat transfer efficiency, it is possible to overheat the incoming air any time the temperature of the exhaust air is greater than about 70° and the temperature of the incoming air is greater than about 30°. This invention also provides a means for manually or automatically changing the efficiency of the system to limit the temperature of incoming air to a preselected value.

SUMMARY OF THE INVENTION

In accordance with the present invention, the heat exchange system comprises a plurality of sealed tubes disposed in generally parallel relationship. The sealed tubes contain a working fluid having a liquid phase and a vapor phase at the operating temperatures. Evaporation of the liquid phase at the warmer end and condensation of the vapor phase at the cooler end results in highly efficient heat transfer longitudinally of the sealed tubes. Such tubes have been referred to as heat pipes when the condensate is returned to the evaporation interface by virtue of capillary action. The length to diameter ratio of the heat pipes may be very high. The heat pipes extend between two air ducts and are provided with heat exchange fins to improve heat transfer from the air to the tubes.

In accordance with an important aspect of the invention, the heat pipes are automatically reversible in order to automatically recover thermal energy during all seasons. Automatic reversibility is achieved by providing for the automatic bi-directional transport of the liquid phase through the relatively long, small diameter, sealed tubes.

In accordance with one aspect of this invention, the liquid phase is transported in either longitudinal direction of the tube by a capillary wick. In accordance with another aspect of the invention, the liquid phase is transported in either direction longitudinally of the tubes by gravity as a result of orienting the elongated tubes so that the liquid phase moves longitudinally under the influence of gravity. In either case, the liquid phase may be transported circumferentially of the tubes by capillary means to increase the quantity of heat transferred from the outside air to the liquid phase in the heat pipe by increasing the liquid-vapor interface area.

In accordance with another aspect of the invention, the heat transfer efficiency of the system can be selectively controlled, either manually or automatically, by limiting the extent to which the liquid phase is transported longitudinally of the tubes. More particularly, this may be accomplished by changing the orientation of the tubes relative to the horizontal so that the liquid phase does not stand in the lower portion of the tube along the entire length of the evaporator section. The efficiency of the heat pipes may be changed automatically in a manner to maintain a predetermined temperature in the incoming air stream.

DESCRIPTION OF THE DRAWINGS

A more complete understanding of the invention may be had by referring to the following detailed description when taken in conjunction with the drawings, wherein:

FIG. 4 is a schematic diagram of another embodiment of this invention;

FIG. 5 is a broken, longitudinal sectional view of an element of the system of FIG. 4;

FIG. 6 is a sectional view taken on lines 6—6 of FIG. 5; and,

FIG. 7 is a view similar to FIG. 5 which illustrates the operation of the embodiment of FIG. 4.

DETAILED DESCRIPTION

Figure 1:
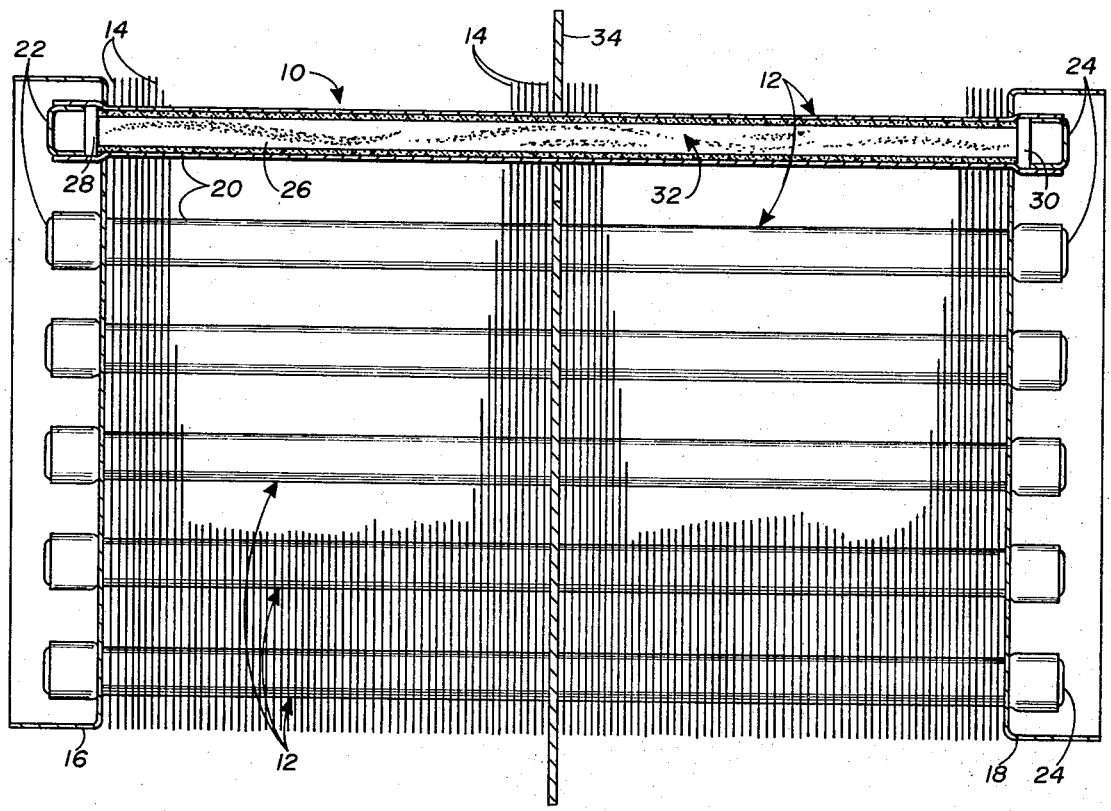
FIG. 1 is a front view of a heat transfer system employing the invention in which certain parts have been broken away to more clearly illustrate certain features of the invention.

Referring now to the drawings and particularly to FIG. 1, there is shown a heat transfer system 10 employing the invention. The system 10 includes a plurality of heat pipes 12 and a plurality of heat exchanging fins 14. The heat pipes 12 are supported in and extend between a pair of end members 16 and 18. Each of the fins 14 extends into engagement with and is supported by each of the heat pipes 12. As is clearly shown in FIG. 1, the fins 14 are positioned at equally spaced intervals along the entire length of the heat pipes 12. It should be noted from FIG. 3 that six stages of heat pipes 12 are provided in the direction of air flow. Each stage has six heat pipes 12 as shown in FIG. 1. Since each stage of heat pipes is independent of the other, a true counter flow heat exchange system is provided in the installation shown in FIG. 3.

Figure 2:
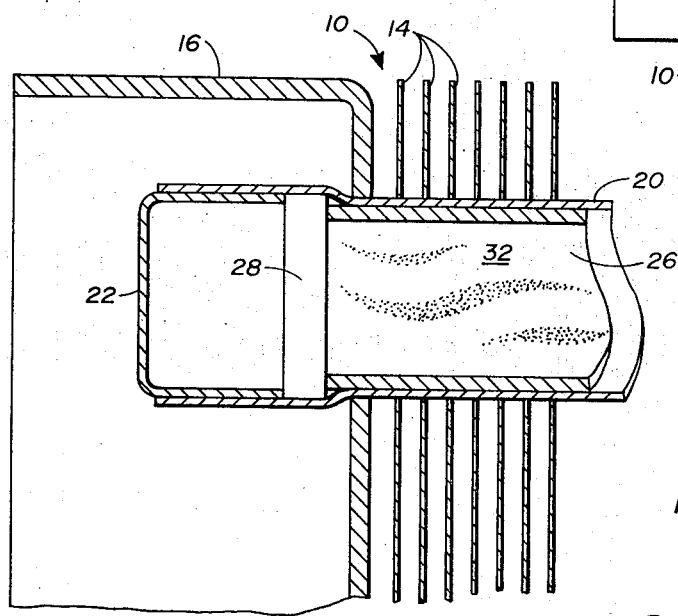
FIG. 2 is an enlarged view of a portion of the device shown in FIG. 1.

The details of the structure of the heat pipes 12 are shown in FIG. 2. Each heat pipe 12 includes an outer tubular shell 20. The ends of the shell 20 are closed by a pair of end caps 22 and 24. A porous capillary wick 26 is positioned within the outer shell 20. The wick 26 is tubular in shape and is positioned in engagement with the inner surface of the shell 20. The wick 26 extends the length of the shell 20 between a pair of plugs 28 and 30. A working fluid 32 is contained within the shell 20 and operates as the heat transfer medium of the heat pipe 12.

The operation of the heat pipes 12 of the system 10 involves the principles of vaporization, condensation and capillary action. Whenever one end of a heat pipe is raised to a temperature higher than the temperature of the other end, the working fluid of the heat pipe is vaporized at the high temperature end of the heat pipe. This transforms the working fluid into a gas or vapor. In the gas or vapor phase, the working fluid travels through the center of the wick of the heat pipe toward the low temperature end of the heat pipe. At the low temperature end, the working fluid is condensed. This transforms the working fluid from a gas or vapor into a liquid. In the liquid phase, the working fluid travels from the low temperature end of the heat pipe to the high temperature end through the wick by capillary action. At the high temperature end, the working fluid is again vaporized. The temperature difference required for circulation of the working fluid may be very small indeed for rather high heat transfer because of the high latent heat of evaporization of the working fluid. Only when velocity of the vapor is an appreciable fraction of the velocity of sound in the vapor is the operation of the heat pipe degraded.

Vaporization of the working fluid in the heat pipe draws heat into the working fluid. Condensation of the working fluid in the heat pipe expels heat from the working fluid. Thus, the heat pipe, through vaporization, condensation and capillary action, operates to absorb heat at its high temperature end, to transfer heat from its high temperature end to its low temperature end and to give off heat at its low temperature end. It should be noted that the heat pipe operates regardless of which end is the high temperature end. Thus, the heat pipe is completely bi-directional in operation.

Referring again to FIG. 1, it will be seen that the fins 14 of the system 10 are divided into two groups which are positioned at the lefthand end and the righthand end of the system 10, respectively. The two groups of fins 14 are separated by a baffle 34. In use, intake air for a building or other enclosure is directed through one of the groups of fins 14 while exhaust air from the enclosure is directed through the other group of fins 14. The system 10 operates to transfer heat between the intake air and the exhaust air. Since the heat pipes 12 are bi-directional in operation, heat is transferred regardless of whether the intake air is warmer than the exhaust air or vice versa. Furthermore, the rate of heat transfer is directly proportional to the temperature differential between the intake air and the exhaust air. That is, the greater the difference in temperature between the intake air and the exhaust air, the greater the rate of heat transfer therebetween. This increase in the amount of heat transferred is not due to a larger temperature drop within the heat pipe itself because the heat pipe is practically isothermal. It is the thermal impedance represented by the transfer of heat from air to the fins and the thermal impedance of conduction of the heat through the fins to the wall of the heat pipe itself which must be overcome by the temperature difference between the intake and exhaust air. The greater this difference of temperature, the greater the heat transfer from one air stream to the other.

Figure 3:
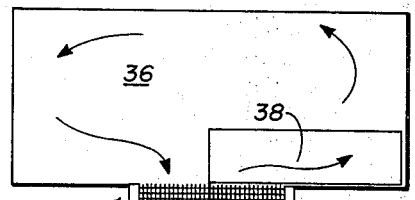
FIG. 3 is a schematic illustration of a ventilating system employing the heat transfer system shown in FIG. 1.

The operation of the system 10 is further illustrated in FIG. 3, wherein an enclosure 36 that is ventilated by a ventilating system 38 is schematically illustrated. As is indicated by the arrows, the ventilating system 38 draws air into the enclosure 36 through the fins 14 positioned on the righthand end of the system 10. Exhaust air leaves the enclosure through the fins 14 positioned on the lefthand side thereof. The system 10 operates to transfer heat between the intake air as it enters the enclosure 36 and the exhaust air as it leaves the enclosure 36.

The component parts of the heat transfer system 10 may be formed from any convenient material. However, the fins 14 and the shells 20 of the heat pipes 12 are preferably formed from a material having a high thermal conductivity, such as metal. The fins 14 and the shells 20 are joined in such a way as to promote transfer of heat between them, such as by brazing, etc. Th working fluid 32 for the heat pipes 12 may be any one of several common fluids, such as water, ammonia, methanol, etc. The heat transfer system 10 may be of such size as is required to accommodate a specific function. That is, by varying the size and number of the heat pipes 12 and the size and number of the fins 14 the system 10 can be used with an enclosure of any size from an automobile to a multiple story building. Of course, the system 10 can be used to transfer heat between different fluids, such as a liquid and a gas. In such a case the fins mounted for engagement by one of the fluids may be entirely different in shape, size and construction from the fins mounted for engagement by the other fluid.

The heat transfer system illustrated in the drawing is superior to prior systems in three general aspects. First, the system is completely bi-directional. Therefore, the system transfers heat from intake air to exhaust air or vice versa, depending on which of the two is at the higher temperature. Second, the system is completely passive and requires neither a motor and pump mechanism nor an air directing mechanism, nor does it require the rotation of large masses with sliding seals as it necessary for the wheel system.

Each of the heat pipes 12 are filled with a working fluid to a depth sufficient to saturate the capillary wick 26 over its entire area at the operating temperature of the system. The capillary wick 26 performs the function of increasing the area of liquid vapor interface where evaporation and condensation of the working fluid actually occurs. This provides maximum heat transfer efficiency from the metal shell 20 to the liquid vapor interface as a result of the increased area. Additionally, the distance from the outer shell to the surface of the liquid phase is kept at a minimum so that the liquid will vaporize at the surface, rather than near the shell.

The capillary wick 26 may also function to transport the liquid phase longitudinally of the heat pipe. However, in practice, it has been found desirable to fill the heat pipe with a quantity of working fluid sufficient for the liquid phase to stand above the wick along substantially the entire length of the heat pipe, as shown at 27 of FIGS. 1 and 2. The liquid phase will then travel longitudinally of the heat pipe from either end to the other by gravity, rather than by the capillary action of the wick.

Another system in accordance with the present invention is indicated generally by the reference numeral 50 in FIG. 4. The system 50 includes a heat transfer system 52 which is very similar to the heat transfer system 10 and which is used in the manner illustrated in FIG. 3. The heat transfer system 52 is comprised of a large number of heat transfer elements 54 which are shown in detail in FIGS. 5 and 6. The elements 54 are each comprised of an elongated tube 56 typically 5/8 inch in diameter and from 4 to 8 feet in length. The ends of the tube 56 are hermetically sealed by caps 58 and 60. Each element 54 is filled with a working fluid having both a liquid phase and a vapor phase at the operating temperature of the system, and may be any one of the working fluids heretofore mentioned. The elements 54 are disposed in parallel relationship and substantially horizontally. Each element 54 is filled with a sufficient quantity of working fluid that the liquid phase stands along substantially the entire length of the tube 56. Experiments show that for optimum results, the liquid phase should occupy approximately one-third of the total volume of the tube. The elements are not provided with a capillary wick for transporting the liquid either longitudinally or circumferentially of the tubes by capillary action. Transport of the liquid longitudinally in both directions is accomplished merely by gravity and the liquid does not spread over the entire interior surface of the tube. A plurality of fins 64 are in good heat exchange relationship with each of the elements 54. The elements 54 extend between the inlet and outlet passageways which are defined by end plates 66 and 68 and central plate 70.

The operation of the heat transfer system 52 is similar to that of heat transfer system 10. For example, assume that in winter cold air is passed into an enclosure between plates 68 and 70 and warm air is exhausted between plates 66 and 70. The liquid within the elements 54 between the plates 66 and 70 will be vaporized as a result of the transfer of heat from the warm exhaust air to the fins 64, to the walls of the tube 56 and finally to the liquid phase 62. The vapor phase in the elements 54 between the plates 68 and 70 will be condensed as a result of the transfer of heat from the working fluid to the wall of the tube 56, to the fins 64 and finally to the fresh cool air. The liquid phase resulting from the condensation of the vapor then returns by gravity from the portion of the heat pipe between plates 68 and 70 to the portion of the heat pipe between plates 66 and 70.

In summary, the liquid phase is vaporized in the section of the elements 54 between plates 66 and 70 by hot exhaust air and the vapor is condensed in the section of the elements between plates 68 and 70 by the cool fresh air. The condensed vapor again returns by gravity, but flows in the opposite direction.

Although the efficiency of each individual element 54 is reduced as a result of the reduction in the area of contact between the wall of the tube 56 and the liquid phase, I have discovered that this reduction in efficiency can be compensated by increasing the total number of stages of the elements 54 in the direction of flow in a given unit 52. Although the reduction in contact area between the liquid phase 62 and the tube 56 is more than 50 percent, the overall reduction in efficiency of the unit is substantially less because the efficiency of the unit is limited more by the thermal impedance in the thermal path from the air through the fins, wall of the pipe and the liquid than longitudinally of the heat pipes. Accordingly, an increase in the number of stages of elements 54 of only 20 to 25 percent will produce a unit 52 of approximately the same efficiency as the unit 10 utilizing capillary wicks 26. The elimination of the capillary wicks 26 is made possible only by utilizing gravity to transfer the liquid phase in both directions along the length of the heat pipe. The heat transfer unit 52 utilizing a greater number of elements 54 may be cost competitive with a unit 10 utilizing heat pipes 12 with capillary wicks 26 because the capillary wicks are a significant part of the cost of the individual heat pipes.

When using either the thermal unit 10 or 52, efficiencies from 60 to 70 percent have been obtained. For example, assume that warm exhaust air passed between plates 66 and 70 is at 76° entering temperature and that cool fresh air passed between plates 68 an 70 is at 6°

F entering temperature. Assuming a 70 percent efficiency and that equal parts of air by weight are passing through the respective conduits, the cool fresh air will be heated to a temperature of 55° F and the warm exhaust air will be cooled to 27° F. During the summer when the cool fresh air becomes hot fresh air, the direction of heat transfer is automatically reversed without switching the flow of air. Then if the incoming hot air is 105° F and the warm exhaust air is 75° F, the incoming air will be cooled to about 84° F and the outgoing air will be heated to about 96° F. The high efficiency is possible because the separate stages of the elements form a true counter flow exchange unit.

In some heating and cooling systems, the maximum temperature of air delivered to any given room is kept below the temperature to which the air will ultimately be heated for comfort. For example, it is common to preheat air to about 50° F at a central point. The 50° F air is then ducted to individual rooms each of which is provided with a thermostatic control and an individual heating unit. In situations where heat is generated within the room by equipment or people, very little heat need be added. Such a room is in effect cooled or air conditioned year round. It will be noted from the previous example based on 70 percent efficiency that the cool fresh air at 6° F is heated to about 55° F by exhaust air at 76° F. Since the 55° F is above the maximum allowable temperature for the fresh air in systems of this type, this invention also contemplates a method for limiting the maximum temperature of the fresh air as will now be described.

In accordance with another aspect of this invention, the efficiency of the thermal transfer unit 52 can be manually or automatically reduced in order to limit the heat transferred from one air stream to the other. As previously mentioned, the elements 54 are normally disposed substantially horizontally so that the liquid phase extends along the entire length of the tubes. I have discovered that the effective length of the elements 54 and, therefore, the overall efficiency of the unit 52, can be reduced by raising the warmer ends of the elements so that the liquid phase does not return by gravity and stand in all of the sections of the elements subject to the warmer air. For example, as shown in FIG. 7, the section of the element 54 in contact with the warm exhaust air is slightly raised so that the liquid phase extends only to point 68a within the element. This effectively removes the length 72 of the element from operation, and, therefore, decreases the quantity of heat transferred from the warm exhaust air to the incoming cool fresh air. This phenomenon can be used to substantially turn the unit 52 off by raising one end of the element only a few tube diameters. Further, the efficiency of the unit is highly predictable and relatively linear over the entire range.

As illustrated in FIG. 4, the unit 52 is shown mounted on a pivot 74. A suitable elevating mechanism 76 is provided to raise and lower one end of the unit 52 about the pivot point 74. The elevating mechanism 76 is driven by a suitable comparator and servo-amplifier 78. A temperature sensor 80 provides a signal representative of temperature of the fresh air at a point downstream of the unit 52. A temperature selector 82 also provides a signal to the comparator and servo-amplifier circuit 78 representative of a manually selected temperature level. The comparator and servo-amplifier 78 compares the signals from the temperature sensor 80 and the temperature sensor 82 and operates the elevating mechanism 76 in a direction to increase or decrease the efficiency of the unit 52, and thereby maintain the temperature of the fresh air downstream of the unit 52 at the selected level.

The comparator and servo-amplifier system 78 should have a sufficient time delay to prevent hunting of the elevating mechanism. Because of the substantial time period for raising and lowering the unit 52 the elevating mechanism 76 may comprise a very small motor with a suitable gearing arrangement to pivot the unit 52 about the balanced point 74. The system 78 preferably also has a manual mode of operation to position the unit 52 at any desired degree of tilt. This provides a means for turning unit 52 off, or of manually selecting a desired level of efficiency.

Although the unit 52 is described as employing elements 54 utilizing no capillary wicks, it will be noted that the principle of changing the efficiency of the unit may still be employed as long as the transport of the liquid phase along the length of the tubes is limited. Thus, a capillary system which effectively transports the liquid only circumferentially but not longitudinally of the tubes can be employed to increase the efficiency of the individual elements 54 while still utilizing this method of varying the efficiency of the unit.

Although preferred embodiments of the invention have been described in detail, it is to be understood that various changes, substitutions and alterations can be made therein without departing from the spirit and scope of the invention as defined by the appended claims.

What is claimed is:

1. A ventilating system including:
   means for circulating air into, through and out of a habitable enclosure;
   a first plurality of fins positioned for engagement by the air as it enters the enclosure;
   a second plurality of fins positioned for engagement by the air as it leaves the enclosure, and
   a plurality of heat pipes extending between fins of the first plurality of fins and fins of the second plurality of fins for thermally interconnecting the fins, each heat pipe being a sealed unit having a working fluid with a free-standing liquid and a substantial vapor space along substantially the entire length of the heat pipe whereby heat will be transferred in either direction between the air entering the enclosure and the air leaving the enclosure as a result of the vaporization of the working fluid in the portion of heat pipe exposed to the warmer air and condensation of the working fluid in the portion of the heat pipe exposed to the cooler air.

2. The ventilating system according to claim 1 wherein the first plurality of fins is substantially equal in number to the second plurality.

3. The ventilating system according to claim 1 wherein each of the heat pipes includes an outer tube, a wick positioned within the tube and a fluid contained within the tube.

4. In a climate control system, the combination of:
   a habitable enclosure the air temperature of which is to be maintained at a generally constant temperature which at times is greater than the air temperature outside the enclosure and at other times is less than the air temperature outside the enclosure, first duct means for conducting air from outside the enclosure to within the enclosure, second duct means for conducting air from within the enclosure to outside the enclosure, and a plurality of heat pipes each capable of transferring heat in both directions as the result of vaporization and condensation of a working fluid extending between the first and second duct means and in heat exchange relationship with the air in each duct means, each heat pipe having a free-standing liquid and a substantial vapor space extending along substantially the length of the heat pipe, whereby heat will automatically be transferred from the warmer air to the cooler air in the first and second duct means.

5. The climate control system of claim 4 wherein each heat pipe comprises an elongated substantially straight tube disposed substantially horizontally, and the liquid phase of the working fluid is transported primarily by gravity in either direction along the heat pipe as determined by the relative temperatures along the tube.

6. The climate control system of claim 5 wherein each heat pipe includes capillary wick means for transporting the liquid phase circumferentially of the tube to increase the area of contact between the liquid phase and the tube.

7. The climate control system of claim 5 further characterized by means for limiting the longitudinal movement of the liquid phase into the portion of the tube exposed to the warmer air to change the effective length of the heat pipes.

8. The climate control system of claim 7 wherein the means for limiting the longitudinal movement of the liquid phase comprises means for tilting the heat pipes relative to the horizontal.

9. The climate control system of claim 7 further characterized by means responsive to the temperature of air which has passed through the first duct means for automatically controlling the means for limiting the longitudinal movement of the liquid phase in the tubes.

10. The climate control system of claim 5 wherein the liquid phase is transported longitudinally of the tubes substantially only by gravity.

11. The climate control system of claim 10 further characterized by means for selectively limiting the longitudinal movement of the liquid phase into the warmer section of the heat pipes to change the efficiency of the heat pipes.

12. The climate control system of claim 11 wherein the means for selectively limiting the longitudinal movement of the liquid phase comprises means for tilting the heat pipes relative to the horizontal.

13. The climate control system of claim 11 further characterized by means responsive to the temperature of air which has passed through the first duct means for automatically controlling the means for limiting the longitudinal movement of the liquid phase in the tubes.

14. In a climate control system for an enclosure the air temperature of which is to be maintained at a generally constant temperature which at times is greater than the air temperature outside the enclosure and at other times is less than the air temperature outside the enclosure, the combination of:

first duct means for conducting air from outside the enclosure to within the enclosure, second duct means for conducting air from within the enclosure to outside the enclosure, a plurality of heat transfer elements each comprised of an elongated sealed tube containing a working fluid having a liquid phase and a vapor phase at the operating temperature of the elements, the elements being disposed substantially horizontally with the liquid phase normally free-standing along substantially the entire length of the elements and leaving a substantial vapor space along substantially the entire length of the elements, and the elements extending between the first and second duct means and being in heat exchange relationship to the air in each of the ducts.

15. The combination of claim 14 wherein the elements include capillary means for transporting the liquid phase circumferential of the tubes to increase the area of the liquid phase-vapor phase interface and the area of contact between the liquid phase and the tubes.

16. The combination of claim 14 further characterized by means for changing the efficiency of the elements by limiting the longitudinal movement of the liquid phase within the elements into the portion of the element in heat exchange relationship with the warmer air.

17. The combination of claim 16 wherein the means for changing the efficiency of the elements comprises means for tilting the elements from the horizontal to prevent the liquid phase from flowing by gravity to at least a portion of the respective elements that are in heat exchange relationship with the warmer air.

18. The combination of claim 16 further characterized by means responsive to the temperature of air which has passed through the first duct means for automatically controlling the means for limiting the longitudinal movement of the liquid phase in the tubes.

19. The combination of claim 14 wherein the length-to-diameter ratio of the tubes is on the order of eighty or greater.

20. The combination of claim 14 further characterized by a plurality of heat exchange fins for transferring heat between the elements and the air in each of the ducts.

21. The combination of claim 14 wherein the elements are arranged in a plurality of stages spaced in the direction of fluid flow, each stage comprising a plurality of elements, and wherein the air in the ducts flows in opposite directions.

* * * * *